Inventor:
Emil Sennhenn

United States Patent Office 3,430,117
Patented Feb. 25, 1969

3,430,117
TWO-PHASE SERVOMOTOR CONTROL INCLUDING MEANS TO DEENERGIZE THE REFERENCE WINDING AT NULL TO CONSERVE POWER
Emil Sennhenn, Darmstadt-Arheilgen, Germany, assignor to Fernseh G.m.b.H., Darmstadt, Germany
Filed May 7, 1965, Ser. No. 453,995
Claims priority, application Germany, May 16, 1964,
F 42,901, F 42,902
U.S. Cl. 318—18      6 Claims
Int. Cl. G05b 11/14; H02p 7/74

ABSTRACT OF THE DISCLOSURE

A servocontrol system in which both windings of a two-phase motor are controlled by the error signal. The error signal developed by a bridge circuit is applied to a signal converter which determines whether the signal is above or below predetermined threshold levels. The output of this conversion stage is, in turn, applied to a switching stage in discriminated form. The switching stage controls the current flow through one phase for winding of the motor depending upon the level of the error signal. The other winding of the motor has the error signal directly applied to it. The arrangement is such that when the error signal is below a predetermined threshold value, the motor winding connected to the switching stage is deenergized.

---

Figure 1:
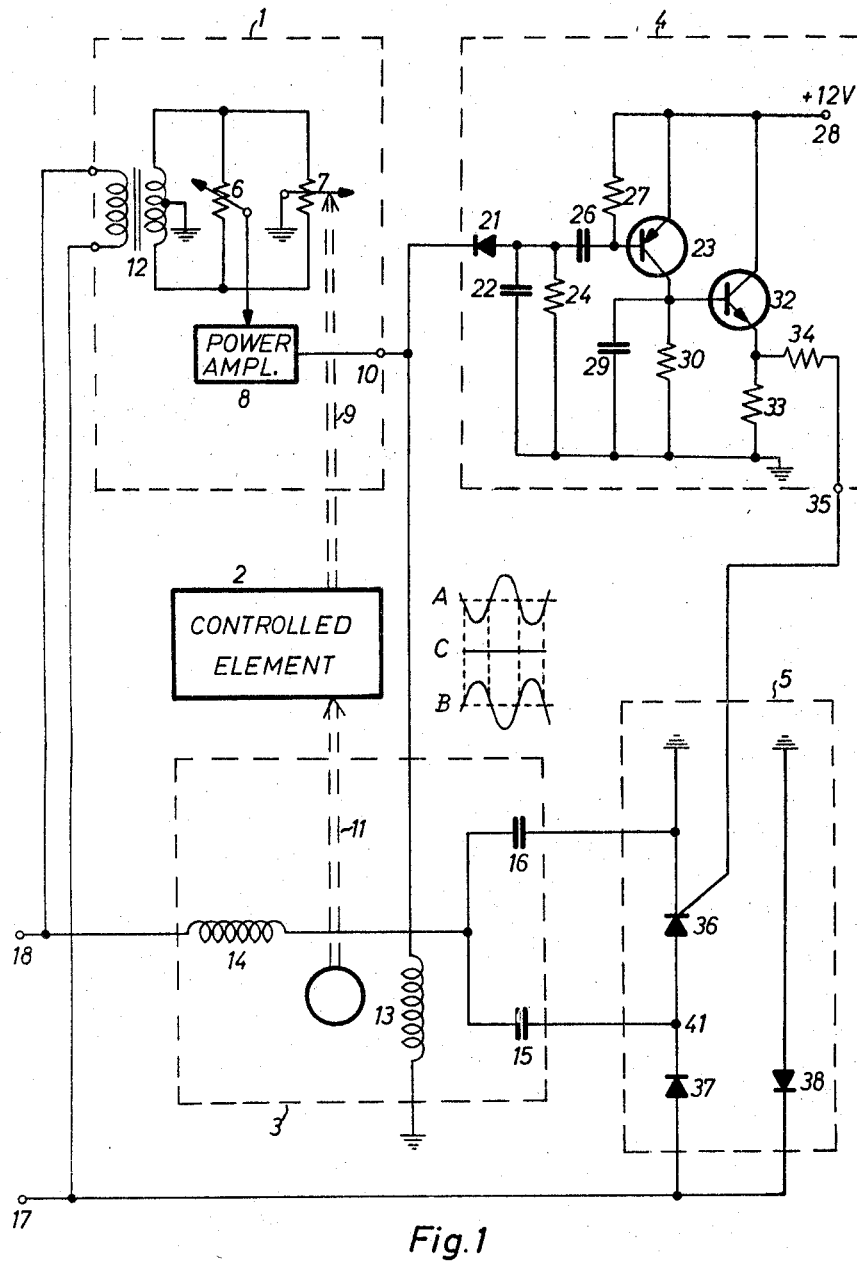

This invention relates to improvement in servomotor apparatus for adjusting a controlled element by the use of an alternating-current servomotor having first and second windings. In such apparatus a control voltage is derived and applied to a first winding on the motor, while the second winding receives a voltage of constant amplitude and of appropriately different phase. The adjustment of the controlled element may be effected either automatically or by manual remote control.

In order to be able to effect remote control of a controlled element within a definite range it is usual to use a servomotor and a bridge circuit including two potentiometers. One of these potentiometers is manually adjustable to a desired setting, corresponding to the intended position of the controlled element. The other potentiometer is coupled for movement in accordance with that of the controlled element, so that its setting corresponds with the actual position of the controlled element. When this actual position of the controlled element differs from the required position, the balance of the bridge is disturbed and an error voltage is developed. This error voltage is converted into a control voltage which is applied to cause the servomotor to rotate in one direction or the other until the controlled element attains the required position.

In the field of television technology it is often required to employ systems such as that described above for the remote control of parts of a television camera. The servomotor systems hitherto employed for this purpose have not been completely satisfactory. Direct-current motors cause interference by sparking at the commutator, in addition there forms on the commutator after a long period of disuse a film of oxide which increases the brush contact resistance and may on occasion prevent the motor from starting. With alternating-current motors these disadvantages of direct-current motors may be avoided. As is known, alternating-current motors may have two windings. The alternating control voltage of varying amplitude is applied to a first of these windings and to the second there is applied an alternating voltage of constant amplitude, the phase of which is shifted by 90° with respect to that of the controlling voltage. Alternating current motors of this type suffer from the disadvantage that power is continuously consumed in the second winding, so that the power supply for the apparatus is continuously loaded, although in practice the servomotor usually runs only seldom and then for short periods of time.

It is a broad object of the present invention to provide a novel control apparatus in which the disadvantages of the known apparatus of this kind are alleviated or removed.

It is a further object of the present invention to provide a novel control apparatus using an alternating-current motor and consuming no power as long as the controlled element is in its required position.

It is still a further object of the present invention to provide a novel control apparatus having a large controlling range.

It is another object of the present invention to provide a novel control apparatus being not affected by the tolerances of control elements and controlled elements.

It is still another object of the present invention to provide a novel control apparatus having a particularly small "dead range." The expression "dead range" is to be understood as meaning the range of adjustment, e.g. of angle, within which no readjustment of the position of the controlled element by the servomotor is possible.

It is an additional object of the present invention to provide for a novel control apparatus for controlling a diaphragm or a variable-density filter within a television camera.

It is still an additional object of the present invention to provide a novel control apparatus for adjusting the focus or the focal length of optical systems of television cameras.

In accordance with the present invention a control voltage of variable amplitude is applied to a first winding of an alternate current motor and an alternating voltage of constant amplitude is applied to a second winding of said motor by way of switching means sensitive to the level of said control voltage. Thus the current through said motor winding is switched on or off according as the level of said control voltage does or does not exceed a predetermined threshold value. The servomotor apparatus thus consumes no power as long as the balance of the bridge is not disturbed.

If this predetermined threshold value is relatively small a large controlling range may be attained but difficulties may arise due to the tolerances of control elements and controlled elements. If, however, on the contrary the predetermined threshold value is relatively large, no difficulties will be encountered, due to the tolerances of control elements and controlled elements, but the controlling range attainable in this way is rather small. In order to avoid these difficulties in a preferred embodiment of the present invention the current through the second winding of the servomotor is switched on when the level of the control voltage exceeds a relatively large threshold value and is switched off when the level of the control voltage has fallen below said predetermined large threshold value. The current through the second winding of the servomotor is however also switched on, whenever the level of the control voltage exceeds a predetermined relatively small threshold value, and is switched off after a predetermined time interval. The relatively large threshold value may, for example, amount to some 40% to 80% of the maximum value of the control voltage. The relatively small threshold value may, for example, amount to some 0.5% to 5% of the maximum value of the control voltage.

If a particularly small "dead range" is required, it is suitable to switch off the current in the second winding, with a certain adjustable delay. In this way the field which is produced by the second winding is present at its full magnitude at least until the control voltage has fallen to a value which is no longer sufficient to drive the servomotor.

Figure 2:
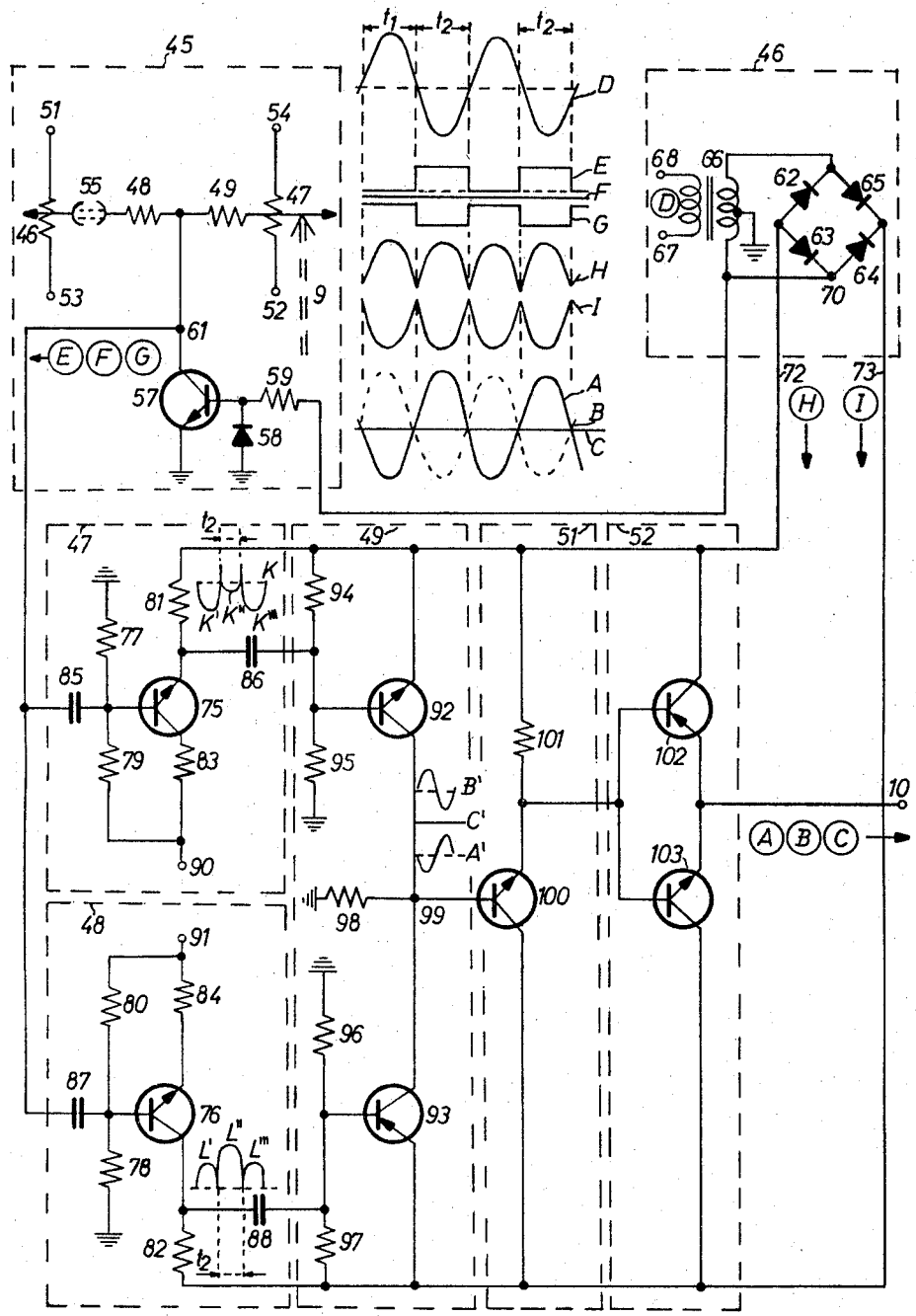

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIGURE 1 is a schematic circuit diagram of a circuit arrangement for remote control of a controlled element embodying the present invention, and FIGURE 2 shows in more detail circuits which may be used to replace some of the arrangements described in relation to FIGURE 1.

In all these drawings corresponding elements are designated by the same reference symbols.

The circuit arrangement shown in FIGURE 1 consists of a control voltage generator 1, a controlled element 2, a servomotor 3, a control voltage converter 4 and a switching stage 5. It is assumed that element 2 is to be remotely controlled. For this purpose there are employed a servomotor 3, a bridge circuit formed by two potentiometers 6 and 7, and a power amplifier 8. The tapping of potentiometer 6 is manually adjustable to a desired setting which corresponds to the required position of the controlled element 2. The tapping of potentiometer 7 is adjusted in accordance with the position of element 2 by way of a coupling element 9. The setting of this potentiometer tapping thus corresponds to the actual position of the controlled element 2. If this actual position differs from the required position, then the balance of the bridge formed by potentiometers 6 and 7 is upset and by the action of the power amplifier 8 there is provided at point 10 in the circuit a control voltage which, according to the direction of unbalance, may be that shown at A or B. These control voltages cause the servomotor 3 to rotate in one direction or the other, thus readjusting the position of controlled elements 2 by way of a coupling element 11. This in turn readjusts potentiometer 7 by way of coupling element 9 until the bridge is again in balance and the control voltage at point 10 falls to zero as indicated by waveform C.

In the present case the controlled element 2 may be a diaphragm or a variable-density filter within a television camera, which is to be remotely controlled by the use of the potentiometer 6. Potentiometer 6 may be built into a control desk distant by some hundreds of meters from the television camera (not shown). The remaining components illustrated in FIGURE 1 are situated within the television camera.

The alternating current servomotor 3 has two windings 13 and 14, of which the former is fed with the control voltage represented by waveforms A, B or C and the latter is fed from an alternating supply received at terminals 17, 18 by way of capacitors 15, 16, which provide a required phase shift in the current flowing in winding 14.

In order to prevent the current flowing in winding 14 from continuing to flow even after the controlled element has reached its required position, the control voltage converter 4 and the switching stage 5 are provided. The control voltage A, B or C from the output of control voltage generator 1 is applied by way of output point 10 to the control voltage converter 4. This control voltage is rectified by means of a diode 21 and is smoothed somewhat by means of the parallel combination of a capacitor 22 and a resistor 24, so that there remains a hum voltage.

Whenever a control voltage A or B is applied via point 10 to the diode 21 there occurs a transient voltage and a hum voltage. Both the transient voltage and the hum voltage are applied by way of capacitor 26 to the base of n-p-n-transistor 23.

If the level of the control voltage changes but does not exceed neither the predetermined small threshold value, then the transient voltage and the hum voltage will not suffice to make the emitter/collector path of transistor 23 conductive.

If the level of control voltage exceeds the predetermined small threshold value only, but not the predetermined large threshold value, then the emitter/collector path of transistor 23 is conductive due to the applied transient voltage, but not due to the hum voltage. After a short time interval the transistor 23 depending upon the time constant of capacitor 26 and resistor 27 the emitter/collector path of transistor 23 will return to its nonconducting state. If however the level of the control voltage exceeds the predetermined small threshold value as well as the predetermined large threshold value, then the emitter/collector path of the transistor 23 is conducting due to the transient voltage and the hum voltage as well and remains conducting as long as the level of the control voltage exceeds the predetermined large threshold value.

The predetermined large threshold level is substantially determined by the values of the capacitor 22 and resistor 24 and by the turn-on voltage of transistor 23, for the values of the smoothing components 22, 24 determine the amplitude of the hum component appearing at the anode of the diode and the turn-on voltage of the transistor determines that amplitude of hum voltage which will cause the transistor to pass current. This threshold value of the control voltage exceeds the predetermined minimum starting voltage of the motor. The predetermined small threshold value is likewise dependent upon the turn-on voltage of transistor 23.

The base bias potential of transistor 23 is determined by a resistor 27 through which the base is connected to the emitter of the transistor and to the positive pole 28 of a direct voltage source, the negative pole of which is earthed. The collector of transistor 23 is returned to earth by way of the parallel combination of a resistor 30 and a capacitor 29. When the emitter/collector path of transistor 23 is conductive, capacitor 29 becomes charged. When the emitter/collector path of the transistor is cut off the capacitor discharges by way of resistor 30. The variation with time of the potential appearing at the collector of transistor 23 thus depends upon the values of the capacitor 29 and the resistor 30. The collector of transistor 23 is connected to the base of a n-p-n-transistor 32 which is connected as an emitter-follower, its collector being taken directly to the positive line and its emitter being returned to earth by way of a load resistor 33. Potentials appearing at the emitter of transistor 33 are taken by way of a resistor 34 to an output terminal 35.

At output terminal 35 of control voltage converter 4 there thus appears a switching signal which is desired by conversion of the control voltage applied to diode 21. The level of this switching signal is thus dependent upon the applied control voltage A, B or C and assumes one of two different values. If neither the predetermined relatively small threshold value nor the large threshold value of the control voltage is achieved, then a stationary condition results and the level of the switching signal has a first value. If the level of the control voltage changes abruptly and exceeds the predetermined small threshold value as well as given large threshold value, then the level of the switching signal attains its second value almost without delay. When the predetermined large threshold value is no longer exceeded, then the switching signal value returns to its initial value only after a certain delay. This delay is dependent upon a time-constant which is given by the values of capacitor 29 and of resistor 30. In general it is suitable for this delay to be greater than $1/100$ second.

If the level of the control voltage changes and exceeds the predetermined small threshold value only, but not the predetermined large threshold value, then the level of the switching signal attains also its second value almost without delay but returns to its initial value after a predetermined time interval. This time interval is dependent upon the time constant which is given by the values of capacitor 26 and of resistor 27 and is further dependent upon the time constant which is given by the values of the capacitor 29 and of resistor 30.

Component values suitable for use in the circuit arrangement of device 4 as described above, for a particular application, were as follows:

| | |
|---|---:|
| Diode 21 | ¹AA 119 |
| Transistor 23 | ¹BCY 12 |
| Transistor 32 | ¹OC 141 |
| Capacitors: | |
| 22 _____μf__ | 50 |
| 26 _____μf__ | 5 |
| 29 _____μf__ | 100 |
| D.C. source: | |
| 48 _____volts__ | +12 |
| Resistors: | |
| 24 _____kilohms__ | 10 |
| 27 _____do____ | 2.2 |
| 30 _____do____ | 8.2 |
| 33 _____ohms__ | 820 |
| 34 _____do____ | 220 |

¹ Mullard.

Switching stage 5 comprises a controlled rectifier 36 and two diodes 37, 38. Together with capacitors 15 and 16, diodes 37, 38 form a bridge circuit, to one diagonal of which is connected the alternating current supply received at terminals 17, 18 in series with motor winding 14, while the other diagonal is constituted by controlled rectifier 36, of which the cathode is earthed. In the quiescent condition of the circuit rectifier 36 is cut off, because there is applied to the control electrode by way of terminal 35 a switching signal having the first value discussed above, that is, substantially earth potential. Under these conditions, capacitors 15, 16 will become charged to potentials which will prevent any appreciable current passing through rectifiers 37, 38. When the voltage converter 4 provides the switching signal having a positive potential with respect to earth, that is, when converter 4 is in its second, or unstable, condition, then rectifier 36 becomes conductive so that capacitors 15, 16 are discharged and diodes 37, 38 can pass current during alternate half-cycles of the alternating current supply. An alternating current flows by way of capacitors 15, 16 through motor winding 14, which is thus energized.

The switching signal applied to switching stage 5 from terminal 35 of the voltage converter 4 thus effects practically undelayed switching on of the current through motor winding 14 when the level of the control voltage exceeds the predetermined large threshold value. When the level of the control voltage falls below the predetermined large threshold value the current through motor winding 14 is switched off. The switching signal applied to switching stage 5 from terminal 35 also effects practically undelayed switching on of the current through motor winding 14 when the level of the control voltage exceeds the predetermined small threshold value but not the predetermined large threshold value. In this case the current through motor winding 14 is switched off after a predetermined time interval not depending upon the level of the control voltage. Owing to the delay in switching off, which is produced as described above, the field of the second motor winding is present at its full magnitude until the control voltage applied to the first motor winding from point 10 in the circuit is no longer sufficient to drive the motor. In this manner a particularly high accuracy of adjustment is achieved.

In particular, the controlled element 2 may comprise a device for adjusting the focus and for adjusting the focal length of optical systems.

The power amplifier 8 of the circuit described in relation to FIGURE 1 usually consists of a push-pull stage using power transistors and a transformer, in addition to a further smaller transformer, a divider stage and a voltage amplifier. To supply the push-pull stage there is often provided a stabilized power pack. Known power amplifiers of this type have the disadvantage that they necessitate a high technical effort in order to obtain a control voltage A, B or C of high power for driving the servomotor 3. A further disadvantage of known push-pull output stages consists in the fact that a relatively large transformer cannot conveniently be mounted upon a circuit board. In a control voltage generator as described below in relation to FIGURE 2, which may be used instead of the control voltage generator 1 of FIGURE 1, these disadvantages are avoided.

The control voltage generator shown in FIGURE 2 consists of a bridge circuit 45, a bridge rectifier 46, time selector stages 47, 48, 49, an impedance converter 51 and an output stage 52.

The bridge circuit 45 of FIGURE 2 consists of potentiometers 46 and 47 having their tappings connected by the series combination of two resistors 48, 49. Potentiometers 46, 47 are connected by way of terminals 51, 52 to a direct current source having a potential of +12 v. with respect to earth and by way of terminals 53, 54 to a direct-current source having a potential of −12 v. with respect to earth. Potentiometer 46 is manually adjustable and may be connected to resistor 48 by way of a cable indicated at 55. Potentiometer 47 is adjustable in accordance with the position of the controlled element (not shown) by way of a coupling element 9. These potentiometers 46 and 47 perform the functions of the potentiometers 6 and 7 of FIGURE 1.

The potential appearing at the junction of resistors 48, 49 is applied to the collector of a n-p-n transistor 57, of which the emitter is earthed and the base is connected by way of a diode 58 to earth and by way of a resistor 59 to a source of alternating voltage (the waveform of this voltage is shown in diagram D), specifically to one end of the secondary winding of a transformer 66, which has an earthed center-tap. The primary winding of transformer 66 is fed with alternating current received at terminals 67, 68. The waveform of this supply is shown in diagram D. The phasing of the alternating voltage applied to the base of transistor 57 is so chosen that the transistor becomes conductive during the half-cycles $t_1$, so that at these times the potential of the collector of the transistor, that is, of point 61 in the circuit, will be held to earth potential, whatever the potentials at the tappings of the potentiometers. During the half-cycles designated $t_2$ in waveform D, however, transistor 57 is cut off so that there results at point 61 in the circuit a potential (error voltage) which depends upon the settings of potentiometers 46 and 47. If the actual position of the controlled element, as denoted by the setting of potentiometer 47, differs from the required position denoted by the setting of potentiometer 48, so that the bridge circuit is unbalanced, then during half-cycles $t_2$ there appear at point 61 error voltages of rectangular waveforms as illustrated by diagrams E and G, the polarity depending upon the direction of unbalance of the bridge. In this way the error voltage is chopped in synchronism with the voltage D. If the bridge is in balance, a zero error voltage appears at point 61 as denoted by waveform F. This process recurs during all the subsequent periods of the alternating current supply.

Bridge rectifier 46 consists of four rectifier diodes 62, 63, 64, 65 connected in the conventional manner. An alternating voltage is applied to one diagonal of the bridge at points 69, 70, so that there appear on leads 72, 73 connected to the other diagonal of the bridge voltages having the half-waves waveforms shown by diagrams H and I.

The error voltage appearing at point 61 in the circuit is applied alike to two circuits 47, 48 which are similar in configuration, though circuit 47 employs a p-n-p transistor 75 and circuit 48 employs a n-p-n transistor 76. A single description will therefore apply to both. The error voltage from circuit point 61 is applied by way of capacitors 85, 87 respectively to the bases of the transistors 75, 76. The standing potentials applied to the bases of the transistors are determined by resistors 77, 78 and 79, 80 through which the bases are respectively returned to earth and to supply terminals 90, 91. The collectors of the transistors are fed from leads 72, 73 by way of respective resistors 81, 82 and the emitters are returned to the respective supply terminals by way of resistors 83, 84.

The bases of transistors 75, 76 receive the error voltage E or G. The collectors are fed respectively with the half-waves H and I. At the collectors of the transistors 75, 76 respectively appear the voltages illustrated by waveforms K and L. It will be seen that the level of these voltages changes in alternate half-cycles. These voltages K and L are applied to the circuit 49. This circuit consists of respective n-p-n and p-n-p transistors 92, 93 having their emitter connected respectively to lines 72, 73 and their collectors connected together. The base of transistor 92 is connected to line 72 by way of a resistor 94 and to earth through a resistor 95, while the base of transistor 93 is returned to earth through a resistor 96 and is connected to line 73 by way of a resistor 97. The junction of the collectors of transistors 92, 93 is returned to earth through a resistor 98. These transistors 92 and 93 respectively are alternatively conductive and cut off (by means of the signals K and L) passing a single half-wave H or I only at a time to the common collector point 99.

If it be assumed by way of example that an error voltage as shown by waveforms G is applied to the circuits 47, 48 then on the one hand the transistor 75 is conducting and the level of its output voltage during the half-cycles $t_2$ is becoming more positive as may be seen by comparison of waveform portions K" with waveform portions K' and K''', and on the other hand transistor 76 is cut off and the level of the portion L" being about equal to the level of the half-wave I. Thus transistor 93 is cut off (its base voltage being about equal its emitter voltage) and transistor 92 is conducting (its base voltage being more positive than its emitter voltage) and the half-wave H only is transmitted to the common collector point 99. During the next half-wave transistor 92 is cut off and transistor 93 is conducting transmitting the half-wave I to the common collector point 99. In this way the signal B' appears at the common collector point 99.

If the error voltage E is applied to the circuits 47, 48 instead of the signal B' the signal A' occurs at the common collector point 99. If the error voltage F is applied to the circuit 47, 48 both transistors 92 and 93 are cut off and at the common collector point 99 appears the signal C'.

The level of the signals A', B' depends upon the level of the error voltage E, G and thus upon the relative displacement of the control element and the controlled element. If by way of example a relative large displacement exists and the level of the chopped error voltage G is relatively large, then the level of the portion K" is relatively positive and effects a large level of the signal B'.

The signals A', B' are of comparatively low power and are applied to the base of an emitter-follower transistor 100, contained in impedance converter stage 51.

The low-impedance signal appearing across the emitter load resistor 101 of transistor 100 is applied to the bases of two output stage transistors 102, 103. These transistors are of the p-n-p- and n-p-n type respectively. They have their collectors connected directly to lines 72 and 73 respectively, while their emitters are commoned and taken to an output terminal 10, to which the first winding of the servomotor is connected. It will be appreciated that the output terminal will thus be fed from each of transistors 102, 103 alternately, the other of these transistors then being cut off. The output voltage thus follows the changes of the original error voltages E, F, G. Control voltages having the waveforms shown by diagrams A, B or C will thus appear as appropriate at the output terminal 10.

Component values suitable for use in the circuit arrangement described above in relation to FIGURE 2 are as follows.

Transistors:
| | |
|---|---|
| 57 | OC 141 |
| 75 | OC 450 |
| 76 | BF 109 |
| 92 | BF 109 |
| 93 | OC 450 |
| 100 | BF 109 |
| 102 | OC 36 |
| 103 | BDY 11 |

Capacitors:
| | | |
|---|---|---|
| 85, 86 | µf | 10 |
| 87, 88 | µf | 10 |

Resistors:
| | | |
|---|---|---|
| 48, 49 | kilohms | 2.2 |
| 59 | do | 4.7 |
| 77, 78 | do | 56 |
| 79, 80 | do | 57 |
| 81, 82 | do | 2.2 |
| 83, 84 | ohms | 220 |
| 94, 97 | kilohms | 2.2 |
| 95, 96 | do | 92 |
| 98 | | |
| 101 | kilohms | 4.7 |

Diode:
| | |
|---|---|
| 58 | AA 119 |

Potentiometers:
| | | |
|---|---|---|
| 46, 47 | ohms | 500 |

While the invention has been illustrated and described as embodied in an arrangement for remote control of a controlled element within a television camera it is not intended to be limited to the details shown, since various modifications and structural changes may be made without departing in any way from the spirit of the present invention.

What is claimed as new and desired to be secured by Letters Patent is:

1. A control apparatus comprising, in combination, a source of alternating current; a control element; a controlled element; an alternating current motor driving said controlled element, said motor having first and second windings; means responsive to the relative displacement of said elements; means for deriving a control voltage depending upon said displacement of said elements; means applying said control voltage to said first motor winding; switch means being switched off whenever a switching signal assumes a first one of two values and being switched on whenever said switching signal assumes a second one of two values; voltage responsive means being responsive to said control voltage, said voltage responsive means delivering said switching signal assuming said first value whenever the level of said control voltage does neither exceed a predetermined small threshold value nor a predetermined large threshold value and assuming said second value for a predetermined time interval after said control voltage exceeds said predetermined small threshold value and as long as said control voltage exceeds said predetermined large threshold value, said voltage responsive means comprising a rectifier having an input lead and an output lead and developing from an applied alternating voltage an uni-directional voltage including a ripple component of magnitude related to the amplitude of said alternating voltage, a transistor having a base, an emitter and a collector, a capacitor, means applying said control voltage to said input lead of said rectifier, connection means connecting said output lead of said rectifier via said capacitor to said base of said transistor, a source of direct current having two poles, connection means connecting the emitter to one pole of said direct current source, a parallel combination of a resistor and a further capacitor connecting said collector of said transistor to the other pole of said direct current source, an output terminal, and connection means connecting said collector via said output terminal to said switch means; means applying said control voltage to said voltage responsive means; means applying said switching signal to said switch means; and means connecting said source of alternating current via said switch means to said second winding.

2. A control apparatus comprising, in combination, a source of alternating current; a control element; a controlled element; an alternating current motor driving said controlled element, said motor having first and second windings; means responsive to the relative displacement of said elements; means for deriving control voltage depending upon said displacement of said elements; means applying said control voltage to said first motor winding; switch means being switched off whenever a switching signal assumes a first one of two values and being switched on whenever said switching signal assumes a second one of two values, said switch means comprising a control rectifier having an anode, a cathode and a control electrode, connection means applying said switching signal to said control electrode of said rectifier, a first diode, a second diode, a first capacitor, a second capacitor, connection means connecting one pole of said source of alternating current via said first diode, via said first capacitor and via said second winding to the other pole of said source of alternating current, connection means connecting said one pole of said source of alternating current via said second diode, via said second capacitor and via said second winding to said second pole of said source of alternating current, and connection means connecting said anode respectively said cathode of said control rectifier to the junction of said first diode and said first capacitor respectively to said second diode and said second capacitor; voltage responsive means being responsive to said control voltage, said voltage responsive means delivering said switching signal assuming said first value whenever the level of said control voltage does neither exceed a predetermined small threshold value nor a predetermined large threshold value and assuming said second value for a predetermined time interval after said control voltage exceeds said predetermined small threshold value and as long as said control voltage exceeds said predetermined large threshold value; means applying said control voltage to said voltage responsive means; means applying said switching signal to said switch means; and means connecting said source of alternating current via said switch means to said second winding.

3. A control apparatus comprising, in combination, a source of alternating current; a control element; a controlled element; an alternating current motor driving said controlled element, said motor having first and second windings; means responsive to the relative displacement of said elements; means for deriving an error voltage depending upon said displacement of said elements; a chopper chopping up an applied voltage in synchronism with said alternating current into a rectangular voltage; connection means applying said error voltage to said chopper; a source of full wave rectifier voltages of mutually opposite polarities, said rectified voltages being in synchronism with said alternating current; a time selection circuit having a control input lead, a first signal input lead, a second signal input lead and delivering via its output lead parts of signals applied to said first signal input lead and said second signal input lead respectively in dependence on the level of signals applied to said control input lead; connection means applying the rectangular error voltage from the output of said chopper to said control input lead; connection means applying said full wave rectifier voltages to said first signal input and said second signal input respectively; an amplifier; connection means connecting the output lead of said time selection circuit to the input of said amplifier; connection means applying a control voltage from the output of said amplifier to said first motor winding; means connecting said source of alternating current to said second winding; switch means being responsive to said control voltage and being switched on when said control voltage exceeds a predetermined threshold value and being switched off when the level of said control voltage falls below said threshold value; and means applying said control voltage to said switch means.

4. A control apparatus comprising, in combination, a source of alternating current; a control element having a mechanical displacement and providing an output signal as a function of said mechanical displacement; a controlled element to be displaced in relation to the mechanical displacement of said control element; an alternating current motor driving said controlled element, said motor having first and second windings; means responsive to the displacement difference of said elements; means for deriving a control voltage as a function of said displacement difference of said elements; means applying said control voltage to said first motor winding; switch means being responsive to said control voltage and being switched on when said control voltage exceeds a predetermined threshold value and being switched off when the level of said control voltage drops below said threshold value; means applying said control voltage to said switch means; and means connecting said source of alternating current via said switch means to said second winding, whereby said controlled element is displaced as a function of the mechanical displacement of said control element so that said second winding is disconnected from said source of alternating current by said switch means when said controlled element is displaced in accordance with the mechanical displacement of said control element.

5. A control apparatus comprising, in combination, a source of alternating current; a control element having a mechanical displacement as a function of a desired value; a controlled element remotely located from said control element and to be displaced in relation to said desired value of said displacement of said control element; an alternating current motor driving said controlled element, said motor having first and second windings; means responsive to the displacement difference of said elements; means for deriving a control voltage as a function of said displacement difference of said element; means applying said control voltage to said first motor winding; switch means being switched off whenever a switching signal assumes a first one of two values and being switched on whenever said switching signal assumes a second one of two values; voltage responsive means being responsive to said control voltage, said voltage responsive means delivering said switching signal assuming said first value whenever the level of said control voltage does neither exceed a predetermined small threshold value nor a predetermined large threshold value and assuming said second value for a predetermined time interval after said control voltage exceeds said predetermined small threshold value and as long as said control voltage exceeds said predetermined large threshold value; means applying said control voltage to said voltage responsive means; means applying said switching signal to said switch means; and means connecting said source of alternating current via said switch means to said second winding, whereby said controlled element is displaced in accordance with the desired value of the mechanical displacement of said control element so that said second winding is disconnected from said source of alternating current by said switch means when said controlled element is displaced to a position as a predetermined function of the position of said control element.

6. A control apparatus comprising, in combination, a source of alternating current; a control element having a mechanical displacement as a function of a desired value; a controlled element remotely located from said control element and to be displaced relative to the desired displacement of said control element; an alternating current motor driving said controlled element, said motor having first and second windings; means responsive to the displacement difference of said elements; means for deriving an error voltage depending upon said displacement difference of said element; a chopper chopping up an applied voltage in synchronism with said alternating current into a rectangular voltage; connection means applying said error voltage to said chopper; a source of full wave rectifier voltages of mutually opposite polarities, said rectified voltages being in synchronism with said alternating current; a time selection circuit having a control input lead, a first signal input lead, a second signal input lead and delivering via its output lead parts of signals applied to said first signal input lead and said second signal input lead respectively in dependence on the level of signals applied to said control input lead; connection means applying the rectangular error voltage from the output of said chopper to said control input lead; connection means applying said full wave rectifier voltages to said first signal input and said second signal input respectively; an amplifier; connection means connecting the output lead of said time selection circuit to the input of said amplifier; connection means applying a control voltage from the output of said amplifier to said first motor winding; and switch means connecting said source of alternating current to said second winding so that said second winding is disconnected from said source of alternating current when the displacement of said controlled element corresponds to the desired displacement of said control element.

References Cited

UNITED STATES PATENTS

| 2,489,637 | 11/1949 | Hand | 318—227 |
| 2,698,411 | 12/1954 | Jarvis | 318—207.55 X |
| 3,237,070 | 2/1966 | Inaba et al. | |

ORIS L. RADER, *Primary Examiner.*

THOMAS E. LYNCH, *Assistant Examiner.*

U.S. Cl. X.R.

318—28, 207, 227